United States Patent
McCaldon

(10) Patent No.: US 9,182,318 B2
(45) Date of Patent: Nov. 10, 2015

(54) METHODS AND APPARATUS FOR INSPECTING COOLING HOLES

(71) Applicant: Pratt & Whitney Canada Corp., Longueuil (CA)

(72) Inventor: Kian McCaldon, Orangeville (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

(21) Appl. No.: 13/957,579

(22) Filed: Aug. 2, 2013

(65) Prior Publication Data

US 2015/0033836 A1 Feb. 5, 2015

(51) Int. Cl.
*G01M 15/14* (2006.01)
*F23R 3/06* (2006.01)
*F01D 25/00* (2006.01)

(52) U.S. Cl.
CPC ............ *G01M 15/14* (2013.01); *F01D 25/00* (2013.01); *F23R 3/06* (2013.01); *B23P 2700/06* (2013.01); *F05D 2230/72* (2013.01); *F05D 2270/3062* (2013.01); *F05D 2270/8041* (2013.01); *F23R 2900/00019* (2013.01); *F23R 2900/03041* (2013.01); *F23R 2900/03042* (2013.01)

(58) Field of Classification Search
CPC ............... B23P 2700/06; F01D 25/00; F05D 2270/3062; G01M 15/14
USPC ....................................................... 73/112.01
See application file for complete search history.

(56) References Cited

U.S. PATENT DOCUMENTS

| | | | |
|---|---|---|---|
| 4,644,162 A * | 2/1987 | Bantel et al. ................... | 250/340 |
| 5,111,046 A | 5/1992 | Bantel | |
| 6,570,175 B2 * | 5/2003 | Bales et al. ................. | 250/559.4 |
| 6,732,582 B2 | 5/2004 | Bunker et al. | |
| 6,909,800 B2 * | 6/2005 | Vaidyanathan ............... | 382/152 |
| 7,040,805 B1 | 5/2006 | Ou et al. | |
| 7,388,204 B2 * | 6/2008 | Key et al. ...................... | 250/340 |
| 7,651,261 B2 * | 1/2010 | Bunker et al. .................. | 374/43 |
| 7,671,338 B2 * | 3/2010 | Key .............................. | 250/340 |
| 7,791,025 B2 | 9/2010 | Key | |
| 7,890,274 B2 | 2/2011 | Bunker et al. | |
| 7,909,507 B2 * | 3/2011 | Bunker et al. ................ | 374/121 |
| 8,215,159 B2 * | 7/2012 | Kell et al. ................. | 73/112.01 |

(Continued)

FOREIGN PATENT DOCUMENTS

| | | |
|---|---|---|
| DE | 19749984 A1 | 6/1999 |
| DE | 102010001485 A1 | 8/2011 |
| WO | 2012133630 A1 | 4/2012 |

OTHER PUBLICATIONS

European Search Report dated Jan. 23, 2015 in respect to EP application No. 14178067.6.

*Primary Examiner* — Freddie Kirkland, III
(74) *Attorney, Agent, or Firm* — Norton Rose Fulbright Canada LLP

(57) ABSTRACT

Methods and apparatus for inspecting cooling holes in a wall of a combustor of a gas turbine engine are disclosed. An exemplary method disclosed may comprise: heating the wall of the combustor; directing a flow of cooling fluid through the one or more cooling holes in the wall of the combustor while the wall is being heated; acquiring a first measurement indicative of a flow rate of the cooling fluid through the one or more cooling holes; and acquiring a second measurement indicative of a cooling effectiveness provided by the cooling fluid flowing through the one or more cooling holes at the flow rate.

11 Claims, 4 Drawing Sheets

(56) References Cited

U.S. PATENT DOCUMENTS

| | | | |
|---|---|---|---|
| 8,244,488 B2* | 8/2012 | Allen et al. | 702/47 |
| 8,287,183 B2* | 10/2012 | Shepard et al. | 374/43 |
| 8,768,646 B2* | 7/2014 | Key | 702/136 |
| 8,810,644 B2* | 8/2014 | Bunker et al. | 348/86 |
| 2002/0076097 A1* | 6/2002 | Vaidyanathan | 382/154 |
| 2009/0016402 A1* | 1/2009 | Bunker et al. | 374/43 |
| 2009/0297336 A1 | 12/2009 | Allen et al. | |
| 2011/0119020 A1* | 5/2011 | Key | 702/135 |
| 2011/0125423 A1 | 5/2011 | Allen et al. | |
| 2011/0235672 A1 | 9/2011 | Shepard et al. | |
| 2012/0154570 A1* | 6/2012 | Bunker et al. | 348/86 |

* cited by examiner

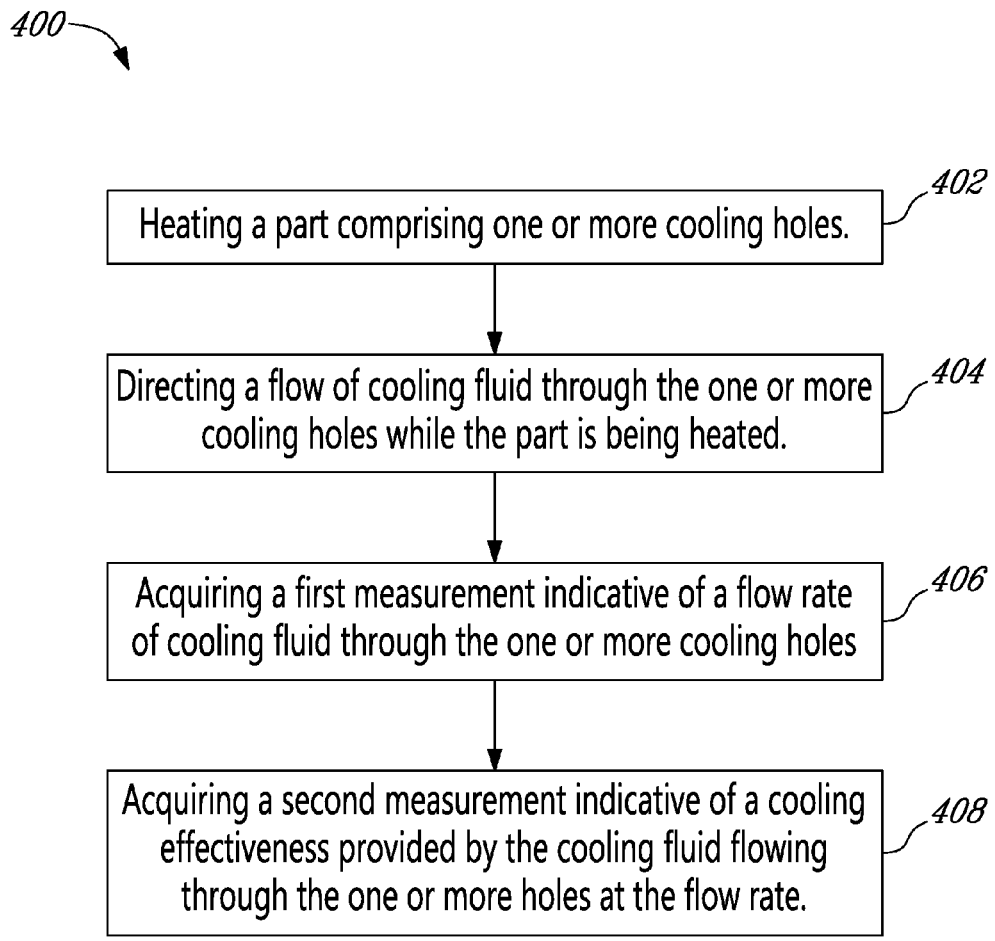

METHODS AND APPARATUS FOR INSPECTING COOLING HOLES

TECHNICAL FIELD

The disclosure relates generally to the inspection of parts, and more particularly to the inspection of parts comprising cooling features.

BACKGROUND OF THE ART

Combustors and certain other components of gas turbine engines are exposed to high temperatures during operation of such engines. Those components can employ cooling techniques in order to withstand such high temperatures. Some combustor walls, for example, comprise effusion holes through which air enters the combustor during operation. As the air passes through the combustor walls via the effusion holes, it simultaneously cools the combustor walls. Such combustors are typically inspected as part of quality-control procedures prior to entry into service at least in part to ensure that the effusion holes are acceptable for entry into service. Existing inspection methods including the dimensional inspection of such effusion holes can be time consuming and relatively expensive to perform.

Improvement is therefore desirable.

SUMMARY

The disclosure describes apparatus and methods useful for inspecting cooling features on parts. For example the apparatus and methods described herein may be used for inspecting one or more cooling holes formed in a wall of a combustor of a gas turbine engine. The inspection of the one or more cooling holes may comprise the acquisition of a first measurement indicative of a flow rate of a cooling fluid through the one or more cooling holes and the acquisition of a second measurement indicative of the cooling effectiveness provided by the cooling fluid flowing through the one or more cooling holes.

In one aspect, the disclosure describes a method for inspecting one or more cooling holes in a wall of a combustor of a gas turbine engine. The method may comprise:

heating the wall of the combustor;

directing a flow of cooling fluid through the one or more cooling holes in the wall of the combustor while the wall is being heated;

acquiring a first measurement indicative of a flow rate of the cooling fluid through the one or more cooling holes; and acquiring a second measurement indicative of a cooling effectiveness provided by the cooling fluid flowing through the one or more cooling holes at the flow rate.

In another aspect, the disclosure describes a method for inspecting one or more cooling holes in a part. The method may comprise:

heating the part;

directing a flow of cooling fluid through the one or more cooling holes of the part while the part is being heated;

acquiring a first measurement indicative of a flow rate of the cooling fluid through the one or more cooling holes; and acquiring a second measurement indicative of a cooling effectiveness provided by the cooling fluid flowing through the one or more cooling holes at the flow rate.

In a further aspect, the disclosure describes an apparatus for inspecting one or more cooling holes in a wall of a combustor of a gas turbine engine. The device may comprise:

a body defining a chamber having an inlet configured to receive a flow of cooling fluid and an outlet configured to interface with the wall of the combustor and direct the flow of fluid through the one or more cooling holes in the wall of the combustor;

a heat source for heating the wall of the combustor while the flow of fluid is directed through the one or more cooling holes in the wall of the combustor;

a first measurement device for acquiring a first measurement indicative of a flow rate of cooling fluid through the one or more cooling holes; and a second measurement device for acquiring a second measurement indicative of a cooling effectiveness of the one or more cooling holes.

Further details of these and other aspects of the subject matter of this application will be apparent from the detailed description and drawings included below.

DESCRIPTION OF THE DRAWINGS

Reference is now made to the accompanying drawings, in which:

FIG. 4 shows a flow chart of a method for inspecting cooling holes in a part.

DETAILED DESCRIPTION

Aspects of various embodiments are described through reference to the drawings.

Figure 1:
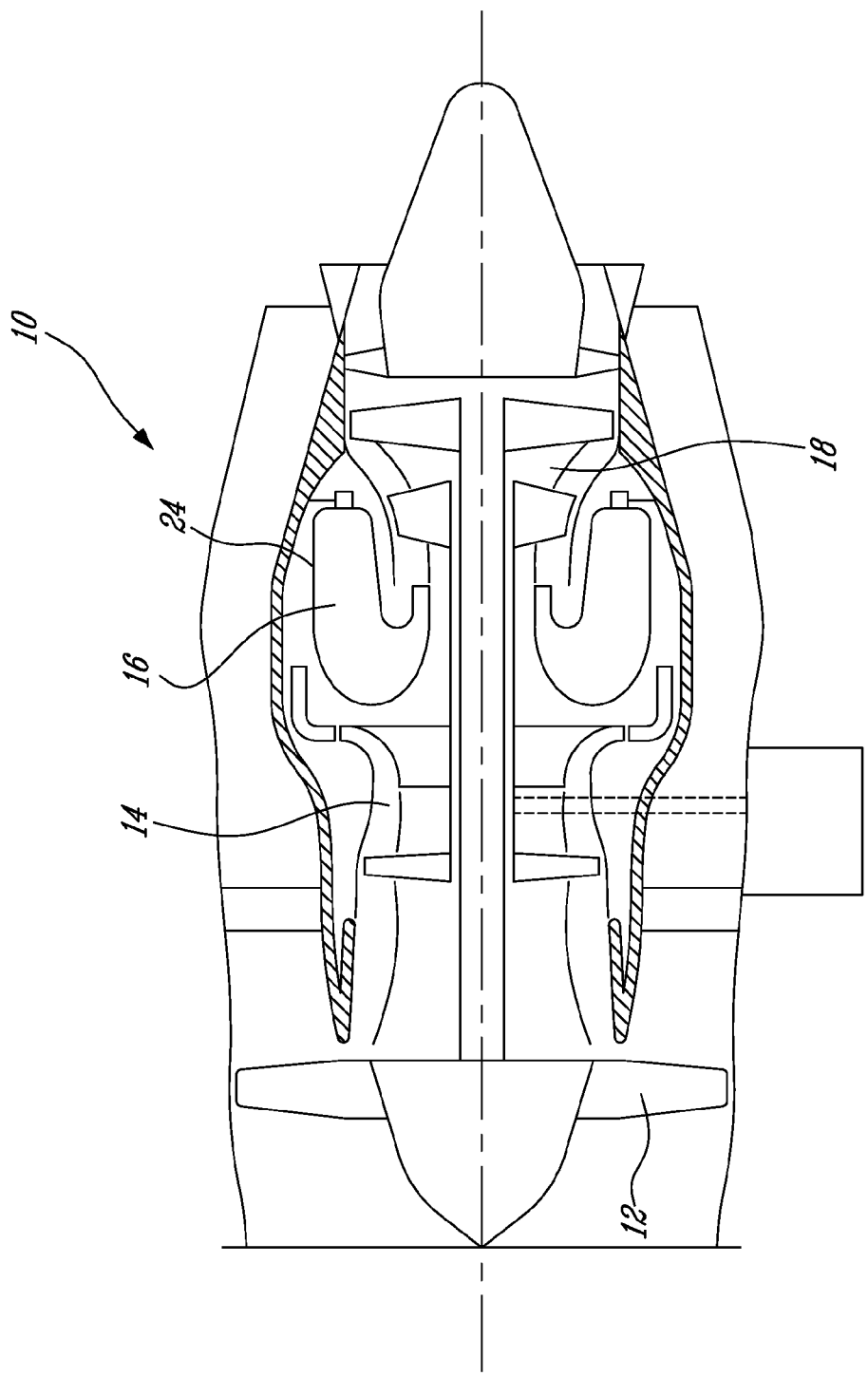
FIG. 1 shows a schematic axial cross-section view of a turbo-fan gas turbine engine.

FIG. 1 illustrates a gas turbine engine 10 of a type preferably provided for use in subsonic flight, generally comprising in serial flow communication a fan 12 through which ambient air is propelled, a multistage compressor 14 for pressurizing the air, a combustor 16 in which the compressed air is mixed with fuel and ignited for generating an annular stream of hot combustion gases, and a turbine section 18 for extracting energy from the combustion gases. Engine 10 may comprise a conventional or other type of gas turbine engine suitable for use in aircraft applications.

Figure 2:
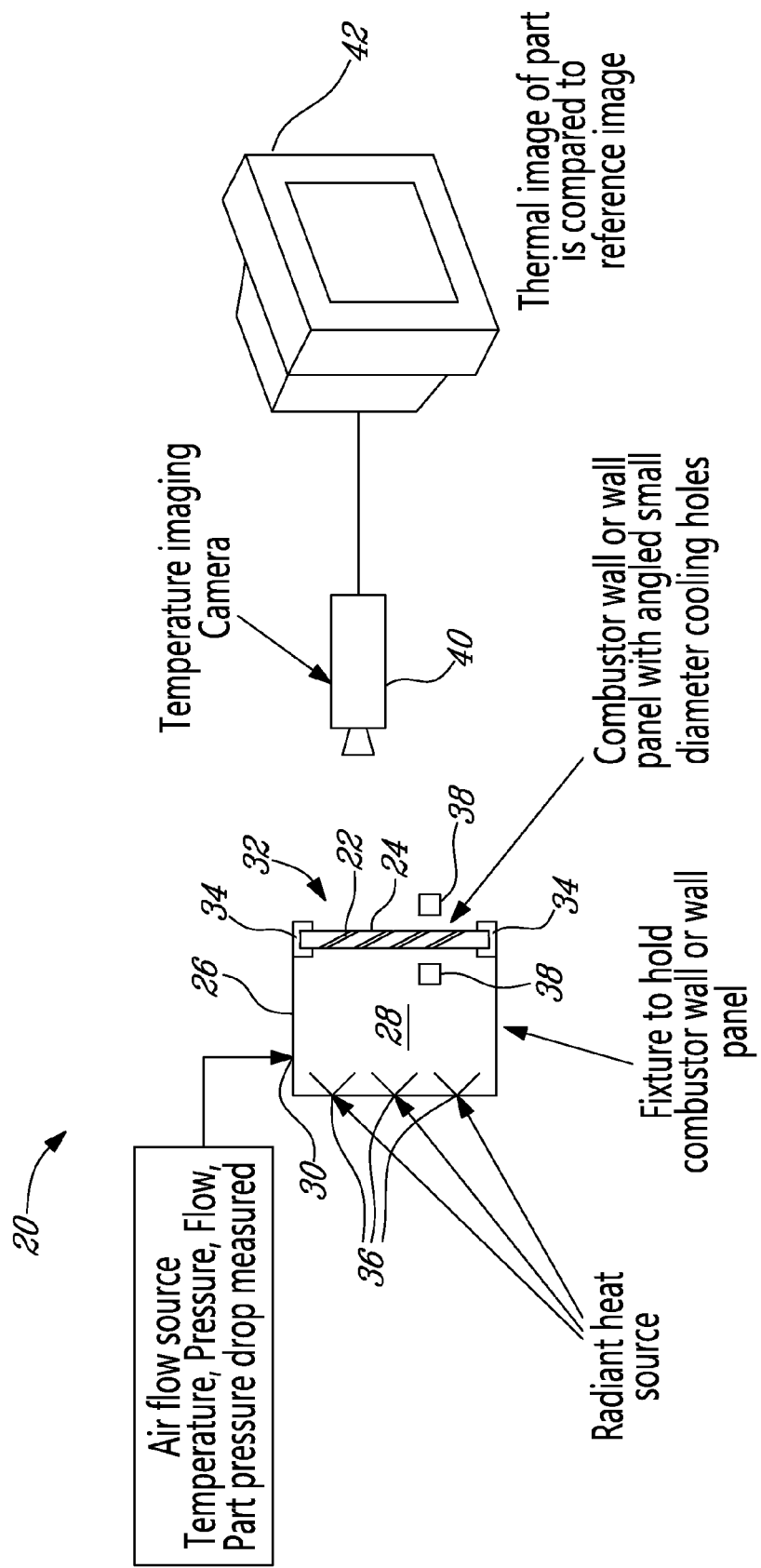
FIG. 2 shows a schematic representation of an apparatus for inspecting cooling holes in a part.

FIG. 2 shows a schematic representation of an exemplary apparatus 20 that may be used to inspect at least a portion of combustor 16. Alternatively or in addition, it is understood that apparatus 20 could also be used to inspect/characterize other parts containing one or more holes that may serve to heat and/or cool the part(s). For example, apparatus 20 may be used to characterize the effectiveness of cooling holes (e.g., effusion holes) extending through one or more walls 24 of combustor 16. As explained below, such characterization may be conducted at substantially steady state or transient conditions.

During operation of gas turbine engine 10, at least a portion of the compressed air delivered by compressor 14 may enter combustor 16 via hole(s) 22. At least some of the compressed air may be consumed during combustion when it is mixed with the fuel and is ignited. The passing (e.g., effusing) of the compressed air through cooling hole(s) 22 may also serve to cool combustor wall(s) 24 during operation of gas turbine engine 10.

Hole(s) 22 may be formed (e.g., drilled) through combustor wall(s) 24 using any suitable known or other manufacturing processes. For example, hole(s) 22 may be formed through combustor wall(s) 24 using laser drilling. Hole(s) 22 may have a generally circular or other suitable shape (e.g., cross sectional profile). As shown in FIG. 2, hole(s) 22 may be formed at an angle from a normal to combustor wall(s) 24. Also, the particular portion(s) of combustor wall(s) 24 may be generally planar and/or curved. Accordingly, one skilled in the relevant arts will appreciate that apparatus 20 could be adapted for inspecting one or more portions of combustor wall(s) 24 which is/are planar, curved or combinations thereof.

The shape, configuration, size, number, spacing and distribution of hole(s) 22 provided in combustor wall(s) 24 may be selected based on the specific application and performance requirements. For example, the arrangement of hole(s) 22 in combustor wall(s) 24 may be based at least in part on modeling and/or empirical data. In some situations, dimensional variations on hole geometry introduced during manufacturing or due to other factors could affect the cooling effectiveness of such hole(s) 22. In gas turbine combustor design, it is common to use a large number of relatively small holes to provide cooling of the combustor wall(s) 24 (e.g., panel). While such hole(s) 22 are generally specified by a nominal hole diameter and angle through wall(s) 24, the actual parameters of importance may be the flow area(s) and the cooling effectiveness provided by such hole(s) 22. For small hole(s) 22, conventional manufacturing processes can, in some applications, produce holes which are neither perfectly circular nor perfectly cylindrical. This can lead to difficulty in measuring hole diameter and angle through the wall using conventional methods in order to substantiate any effect on both the flow area and the cooling effectiveness.

After the forming of hole(s) 22 in combustor wall(s) 24, it may be desirable to inspect hole(s) 22 (e.g., characterize the performance of hole(s) 22) prior to entry into service. Accordingly, apparatus 20 may be used to conduct such inspection of hole(s) 22. In some embodiments, apparatus 20 may be used to inspect hole(s) 22 under conditions that at least partially approximate in-service conditions. Alternatively, apparatus 20 may be used to inspect hole(s) 22 under (e.g., controlled) conditions selected and suitable for the purpose of inspection even though such conditions may not approximate in-service conditions (e.g., such controlled conditions could be scaled up of down from typical in-service conditions).

Apparatus 20 may comprise one or more bodies 26 defining one or more chambers 28. Chamber(s) 28 may have one or more inlets 30 configured to receive one or more flows of cooling fluid(s) and one or more outlets 32 configured to interface with wall(s) 24 of combustor(s) 16 and direct the flow(s) of cooling fluid(s) through the one or more holes 22 in wall(s) 24 of combustor(s) 16. Chamber(s) 28 may serve as a collection chamber for distributing the cooling fluid across wall(s) 24. The cooling fluid(s) directed through chamber(s) 28 and through hole(s) 22 of wall(s) 24 may comprise ambient air that has been pressurized to a desired pressure and directed to chamber(s) 28 via inlet(s) 30. In some applications, the ambient air used as cooling fluid may only be subjected to pressurization. For example, aside from pressurization, no other conditioning (e.g., cooling, heating, humidification, de-humidification) may be conducted on the ambient air used as cooling fluid in some applications.

Outlet(s) 32 of chamber(s) 28 may be configured to provide a substantially air tight interface between chamber(s) 28 and wall(s) 24 so that, under the desired conditions (e.g., pressure), most of or substantially all of the particular cooling fluid (e.g., air) flowing through chamber(s) 28 may flow through hole(s) 22 which is/are being inspected. Accordingly, one or more suitable seals 34 may be provided between wall(s) 24 and chamber(s) 28. For example, seal(s) 34 may be configured to extend along a perimeter of a portion of wall(s) 24 to be inspected.

Apparatus 20 may comprise one or more heat source(s) 36 for heating wall(s) 24 of combustor(s) 16 while the flow(s) of cooling fluid(s) is/are directed through hole(s) 22 of wall(s) 24. For example, heat source(s) 36 may comprise one or more sources of radiant heat where heat may be transferred to wall(s) 24 via electromagnetic radiation. For example, heat source(s) 36 may comprise one or more infrared heaters. Heat source(s) 36 may be disposed inside of chamber(s) 28 and be oriented to direct heat towards an inward-facing side of wall(s) 24. Alternatively or in addition, one or more heat source(s) 36 may be disposed outside of wall(s) 24 and may be oriented to direct heat toward an outward-facing side of wall(s) 24. Depending on the size of wall(s) 24 that is being inspected, multiple heat source(s) of the same or different types may be used to heat different portions of wall(s) 24. For example an array of heat source(s) 36 may be used in some embodiments to provide a desired temperature distribution or heat input across wall(s) 24. It is understood that heat source(s) 36 may be selected and controlled to provide the desired heat input to wall(s) 24 whether a substantially uniform or variable heat input is required across wall(s) 24. For example, heat source(s) 36 may be selected and controlled to provide one or more desired temperatures at one or more points on wall(s) 24 via one or more suitable feedback control loops (not shown). Heat source(s) 36 may also be configured to provide substantially consistent heating pattern from one part (e.g., wall(s)) to another. It is understood that one or more heat sources 36 of type(s) other than radiant may be suitable.

Apparatus 20 may be configured to permit the acquisition of measurement(s) indicative of a flow rate of the fluid through hole(s) 22 and also measurement(s) indicative of a cooling effectiveness provided by hole(s) 22. For example, both types of measurements may be acquired while wall(s) 24 is/are being heated via heat source(s) 36 and the flow of cooling fluid is being directed through hole(s) 22. Accordingly, both types of measurements may be acquired during the same inspection procedure. For example, both types of measurements may be acquired substantially simultaneously under substantially the same inspection conditions. Also, both types of measurements may be acquired at substantially steady-state conditions when at least one temperature of wall(s) 24 may have substantially stabilized. One skilled in the relevant arts will appreciate that measurements other than those described herein could also be acquired during the same inspection procedure instead of or in addition to the measurements described herein. For example, other temperature, pressure and/or flow rate measurement techniques could be used to characterize the fluid being directed through hole(s) 22 of wall(s) 24 and its cooling effectiveness.

As mentioned above, hole(s) 22 formed in wall(s) 24 of combustor(s) 16 may serve to provide combustion air to combustor(s) 16 and simultaneously provide cooling of wall(s) 24, which may be exposed to combustion gases inside of combustor(s) 16. Accordingly, acquiring one or more measurements indicative of the flow rate of fluid (e.g., air) through hole(s) 22 may be of interest. For example, such measurement(s) may be of interest to provide an indication of whether hole(s) 22 permit an amount of air into combustor that meets the requirements for combustion and/or any other requirements related to the operation of gas turbine engine 10. Such measurement(s) indicative of flow rate may be used to determine the flow area provided by hole(s) 22 in wall(s) 24. The flow rate measured may be a total (i.e. overall, cumulative) flow rate of cooling fluid flowing through the portion(s) of wall(s) 24 being inspected. The flow rate of interest may be a volumetric or mass flow rate of cooling fluid(s) through hole(s) 22 of wall(s) 24 under particular inspection conditions. For example, such measurement(s) could include a pressure drop in the cooling fluid across wall(s) 24. For example, using a source of pressurized air at known condition(s) as a cooling fluid, it may be appropriate to measure a pressure upstream of wall(s) 24 to obtain an indication of the resistance to flow of cooling fluid that is provided by hole(s) 22 in wall(s) 24. Such measurement may be indicative of the flow rate of air through wall(s) 24. The comparison of such pressure measurement(s) with baseline data may be used to determine whether hole(s) 22 in wall(s) 24 are acceptable for in-service use. Accordingly, such pressure measurement(s) may be used as part of a quality control inspection procedure.

In order to measure the flow capacity of the part (e.g., combustor 16, wall 24), the pressure and temperature upstream of the part and the fluid pressure drop across the part may be measured and may be controlled to improve the consistency of the measurement(s). By using fluid temperatures which are different than the temperature of the part, cooling or heating patterns are created on the surfaces of the part and these patterns can then be measured to assess the effectiveness of holes 22 (e.g., cooling passages) in each individual part.

The ambient air used for flow measurement may be passed through the heated part, thereby allowing the flow capacity of the part to be measured. At the same time, the same air provides cooling to the heated part, creating a pattern of temperature on the part, which can be assessed using known or other thermographic methods. This may allow both the flow capacity and the effectiveness of the pattern of the cooling holes 22 on the part to be assessed simultaneously.

The pressure measurement(s) may be obtained via one or more first measuring device(s) 38 disposed upstream of wall(s) 24 and one or more first measuring device(s) 38 disposed downstream of wall(s) 24. In some embodiments, first measuring device(s) 38 may comprise one or more pressure, temperature, fluid velocity and/or any other types of sensors that may be used to provide an indication of the flow rate of cooling fluid through hole(s) 22 of wall(s) 24. First measuring device(s) 38 may measure conditions upstream and/or downstream of wall(s) 24. For example, first measuring device(s) 38 may be disposed inside and/or outside of chamber(s) 28. In some embodiments where, the pressure downstream of wall(s) 24 is already known or is the atmospheric pressure (e.g., ambient conditions), it may not be necessary to have first measuring device(s) 38 disposed downstream of wall(s) 24 depending on the measurement(s) acquired.

In order to characterize the cooling effectiveness of hole(s) 22, it may be desirable to acquire one or more measurements indicative of the temperature at one or more points on wall(s) 24 to determine whether adequate cooling of wall(s) 24 is provided by hole(s) 22 under certain conditions. In some embodiments, measurement(s) indicative of cooling effectiveness may be of different types than measurement(s) indicative of flow rate. However, as mentioned above, it may be desirable to acquire the measurement(s) indicative of cooling effectiveness and the measurement(s) indicative of flow rate under substantially the same inspection conditions. Measurement(s) representative of the temperature(s) of wall(s) 24 may be obtained using known or other methods. For example, in some embodiments, it may be appropriate to acquire one or more temperature measurements of wall(s) 24 using one or more thermocouples or other suitable temperature probes. It may also be desirable to acquire temperature measurements at one or more points across wall(s) 24. For example, it may be desirable to acquire a temperature distribution (field) across different regions of wall(s) 24 so that the cooling effectiveness may be characterized in different regions of wall(s) 24.

Accordingly, apparatus 20 may comprise one or more second measurement device(s) 40 that may be used to acquire one or more measurements representative of the cooling effectiveness (e.g., thermal data) of hole(s) 22 in wall(s) 24. For example, second measurement device(s) 40 may comprise one or more thermal imaging sensors (e.g., infrared camera(s)) or other suitable temperature measuring device. While wall(s) 24 of combustor(s) 16 may be being heated and the flow(s) of cooling fluid (e.g., air) is/are being directed through hole(s) 22, second measurement device(s) 40 may capture and record one or more thermal images (e.g., thermal data) of wall(s) 24 or of different portions of wall(s) 24. The one or more thermal images may be representative of a temperature distribution (e.g., field) across at least a portion of wall(s) 24. Such thermal images may then be compared to a baseline (e.g., reference) thermal image or other data to determine whether the cooling effectiveness provided by hole(s) 22 and cooling fluid is appropriate for in-service conditions while the flow rate of cooling fluid meets combustion and/or other requirements.

Such thermal images may be displayed and assessed by a user via display monitor 42. Alternatively, such thermal images may be automatically compared to one or more baseline images via computer processor(s) (shown in FIG. 3 and described below) according to known or other methods. Accordingly, such measurement(s) indicative of cooling effectiveness may be used as part of a quality control inspection procedure. It is understood that other temperature, pressure and/or flow rate measurement techniques could be used to characterize the fluid being directed through hole(s) 22 of wall(s) 24 and also the cooling effectiveness provided by such fluid.

Figure 3:
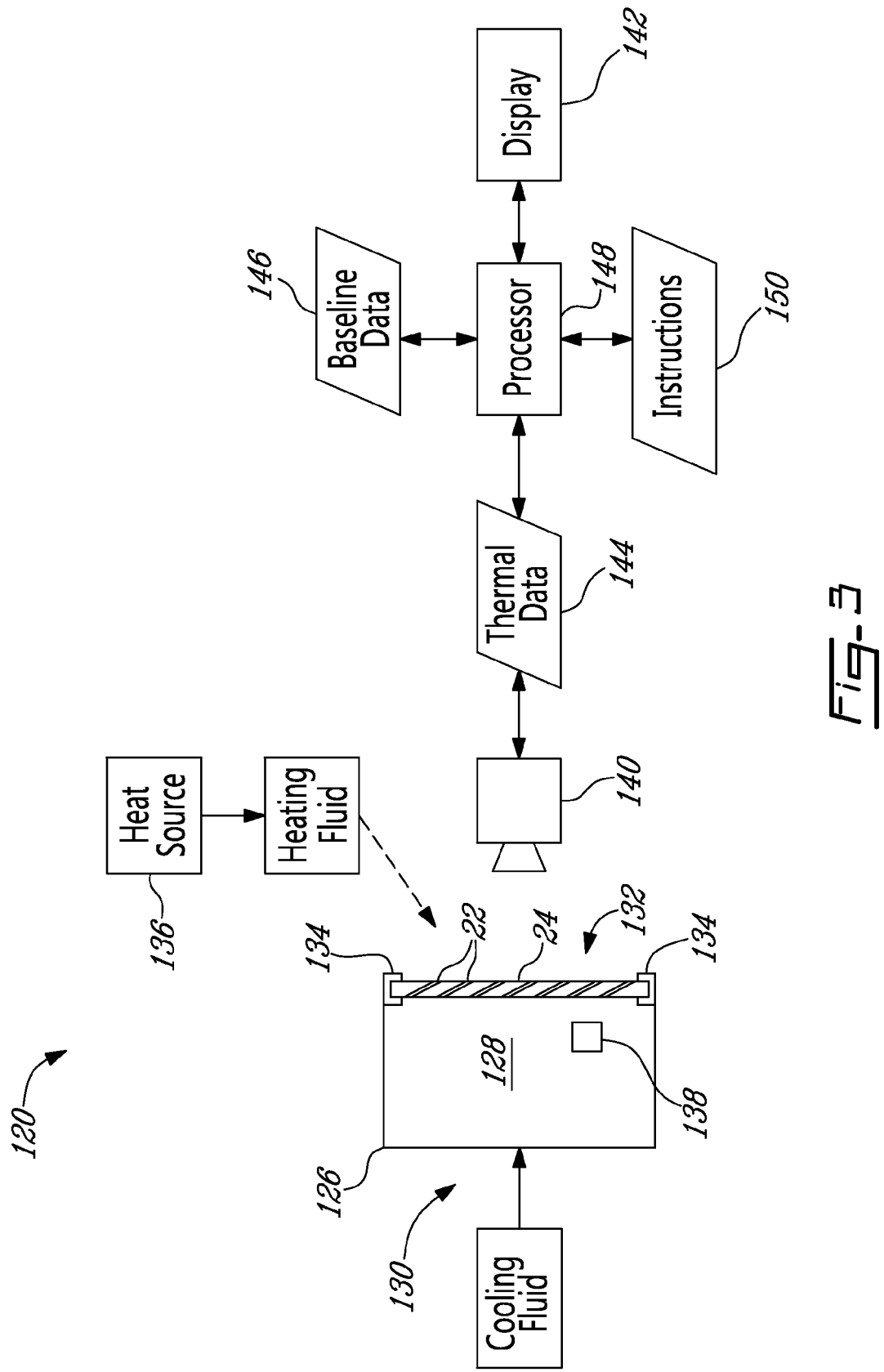
FIG. 3 shows a schematic representation of another apparatus for inspecting cooling holes in a part.

FIG. 3 shows schematic representation of another exemplary apparatus 120 for inspecting cooling holes in a part. It is understood that features of apparatus 120 could be integrated with features of apparatus 20 and vice versa. Many similarities that will be apparent to one skilled in the art may exist between apparatus 20 of FIG. 2 and apparatus 120 of FIG. 3. Accordingly, detailed description of various similar elements previously described above will not be repeated.

Apparatus 120 may still be used to inspect hole(s) 22 provided in wall(s) 24 of combustor(s) 16. Similarly to apparatus 20 described above, apparatus 120 may comprise one or more bodies 126 defining one or more chambers 128. Chamber(s) 128 may comprise inlet(s) 130 configured to receive flow(s) of cooling fluid(s) and outlet(s) 132 configured to interface with wall(s) 24 of combustor(s) 16 via seal(s) 134. Apparatus 120 may comprise heat source(s) 136. Heat source(s) 136 may comprise one or more heaters configured to heat a heating fluid (e.g., air) to be directed toward wall(s) 24 so that wall(s) 24 may be heated before and/or while the cooling fluid flows through hole(s) 22 in wall(s) 24. For example, heat source(s) 136 may be disposed downstream of chamber(s) 128 so that the heating fluid may be directed toward an outward-facing side (i.e., outward from chamber 128) of wall(s) 24. Accordingly, heat source(s) 136 may serve to heat wall(s) 24 indirectly via the heating fluid. In some embodiments, it may be desirable to have additional heat sources such as source of radiant heat (not shown in FIG. 3) in addition to heat source(s) 136. The heating fluid may comprise ambient air that is heated to a desired temperature. The temperature and amount of heating fluid required may be selected to achieve a desired temperature of wall(s) 24 during inspection. In some embodiments, it may be desirable to approximate actual in-service (or appropriately scaled) conditions during inspection.

Apparatus 120 may also comprise one or more first measuring device(s) 138 for acquiring one or more measurement(s) indicative of the flow rate of cooling fluid through the one or more hole(s) 22 in wall(s) 24. Apparatus 120 may also comprise one or more second measuring device(s) 140 for acquiring one or more measurement(s) indicative of cooling effectiveness of the one or more hole(s) 22. First measuring device(s) 138 and second measuring device(s) 140 may be of the types described above in relation to apparatus 20. For example, the measurement(s) indicative of cooling effectiveness, such as one or more temperature and/or thermal images, may be displayed and assessed by a user via display monitor 142. It is understood that other temperature, pressure and/or flow rate measurement techniques could be used to characterize the fluid being directed through hole(s) 22 of wall(s) 24.

For example, second measurement device(s) 140 may be used to acquire thermal data 144 for comparison with baseline data 146. Baseline data 146 may be representative of a desired temperature distribution (e.g., field) for wall(s) 24. As mentioned above in relation to apparatus 20, thermal data(s) 144 may be compared to baseline data 146 by a user or at least partially automated via one or more processors 148. Processor(s) 148 may be configured to perform some or all of the comparison according to machine-readable instructions 150 stored in suitable memory (not shown) accessible by processor(s) 148. Thermal data(s) 144 captured by second measurement device(s) 140 and baseline data 146 may also be stored in the same or other suitable memory (not shown) accessible by processor(s) 148.

FIG. 4 illustrates an exemplary method 400 for inspecting one or more cooling hole(s) 22 in wall(s) 24 of combustor(s) 16 of gas turbine engine 10. Such method may, for example, be conducted using apparatus 20 and/or apparatus 120. Alternatively, method 400 may not necessarily be limited for use with apparatus 20 and/or 120 but could be conducted using other suitable apparatus not necessarily described herein.

For example, method 400 may comprise: heating the part (see block 402); directing a flow of cooling fluid through the one or more cooling holes 22 of the part while the part is being heated (see block 404); acquiring a first measurement indicative of a flow rate of the cooling fluid through the one or more cooling holes 22 (see block 406); and acquiring a second measurement indicative of a cooling effectiveness provided by the cooling fluid flowing at the flow rate through the one or more cooling holes 22 (see block 408). As mentioned above, the part may comprise one or more combustors 16, combustor wall(s) 24 or any portions thereof. Other types of parts comprising such cooling holes or features could also be characterized using the methods and apparatus disclosed herein.

For example, the acquisition of the first measurement and the acquisition of the second measurement may be done at substantially steady-state conditions. Accordingly, the acquisition of the measurements may be conducted when a temperature of wall(s) 24 is substantially stable and within a desired range and similarly when a flow rate of cooling fluid is also substantially stable and within a desired range. The acquisition of measurements at steady state conditions may allow for measurements which are not subjected to variations over the course of time and, in some cases, may be more representative of in-service situations affecting the long term life of the wall(s) 24 (or other applicable part).

Alternatively, in some embodiments, the acquisition of the first and second measurements may be done at transient conditions. In any event, the measurement indicative of cooling effectiveness may, in some embodiments, correspond to the particular flow rate of cooling fluid flowing through cooling hole(s) 22 at a particular time. For example, the acquisition of the first and second measurements may be done during the same inspection procedures and under the same inspection conditions. In some embodiments, the acquisition of the first and second measurements may be done substantially simultaneously.

Parameters of method 400 could be selected and controlled based on expected in-service conditions for wall(s) 24. For example, in some embodiments, such parameters may include the pressure, temperature and flow rate of the cooling fluid(s) and also the temperature of wall(s) 24 of combustor(s) 16. Such parameters could be selected to approximate in-service conditions and/or particular phases of operation of wall(s) 24 or of any other suitable part.

As mentioned above, the first measurement(s) indicative of flow rate of cooling fluid may comprise a pressure drop across wall(s) 24 and such first measurements may be acquired via first measuring device(s) 38, 138. For example, first measuring device(s) 38, 138 may comprise one or more devices configured to measure at least one of a pressure drop of the cooling fluid across wall(s) 24 of combustor 16, a fluid temperature upstream of wall(s) 24 and a fluid pressure upstream of wall(s) 24. The second measurement(s) indicative of cooling effectiveness may comprises a temperature at one or more points on wall(s) 24 and such second measurements may be acquired via second measuring device(s) 40, 140. Second measuring device(s) 40, 140 may be configured to acquire a temperature distribution (e.g., map) across at least a portion of wall(s) 24. In some embodiments, second measuring device(s) 40, 140 may be configured to acquire a thermal (e.g., infrared) image of at least a portion of wall(s) 24.

Cooling fluid(s) may comprises pressurized ambient air or any other suitable cooling fluid(s). In some embodiments, cooling fluid(s) may be selected based on expected in-service conditions and accordingly may be of the same type as in the expected in-service conditions. For example, the cooling fluid(s) may comprise ambient air where only pressurization is conducted on the cooling fluid prior to being directed through the one or more holes 22 of wall(s) 24 of combustor 16. In some embodiments, no further conditioning (e.g., cooling, heating, humidification and/or de-humidification) may be conducted on the cooling fluid(s) prior to being directed through hole(s) 22.

Heating of the part or portion of wall(s) 24 may be conducted using one or more heating sources 36, 136. Heating source(s) 36, 136 may be of different types than those shown or described herein. For example, heating source(s) 36, 136 may be configured to cause heating of wall(s) 24 while cooling fluid(s) (e.g., pressurized ambient air) is/are directed through hole(s) 22 of wall(s) 24. For example, heating of wall(s) 24 may be conducted via radiant energy being directed toward wall(s) 24 and/or via one or more heating fluids (e.g., heated air) being directed toward wall(s) 24.

Method 400 and/or any other methods disclosed herein may also comprise comparing thermal data 144 obtained from second measuring device 40, 140 with baseline data 146 to determine whether the cooling effectiveness provided by cooling fluid(s) and hole(s) 22 is suitable for service. Such comparison may be conducted by an operator (e.g., visually) or may, in some embodiments, be conducted at least in part by processor(s) 148 in accordance with machine-readable instructions 150 when such machine-readable instructions 150 are executed by processor(s) 148. One or more of the results of the comparison, thermal data 144 and/or baseline data 146 may be displayed on display 142.

Methods and apparatus disclosed herein may, according to some embodiments, reduce or eliminate costly and time-consuming measurements of the geometry of individual hole(s) 22 by measuring cooling effectiveness and flow rate. The measurements of cooling effectiveness and flow rate of cooling fluid may also be done instead of attempting to estimate a flow rate based on part temperature rise with time. Methods and apparatus disclosed may also permit the acquisition of measurements indicative of flow rate and also cooling effectiveness during the same test procedure (e.g., at the same time) and thereby reduce inspection time.

The above description is meant to be exemplary only, and one skilled in the relevant arts will recognize that changes may be made to the embodiments described without departing from the scope of the invention disclosed. For example, the blocks and/or operations in the flowcharts and drawings described herein are for purposes of example only. There may be many variations to these blocks and/or operations without departing from the teachings of the present disclosure. For instance, the blocks may be performed in a differing order, or blocks may be added, deleted, or modified. The present disclosure may be embodied in other specific forms without departing from the subject matter of the claims. Also, one skilled in the relevant arts will appreciate that while the apparatus and devices disclosed and shown herein may comprise a specific number of elements/components, the apparatus and devices could be modified to include additional or fewer of such elements/components. The present disclosure is also intended to cover and embrace all suitable changes in technology. Modifications which fall within the scope of the present invention will be apparent to those skilled in the art, in light of a review of this disclosure, and such modifications are intended to fall within the appended claims.

What is claimed is:

1. A method for inspecting one or more cooling holes in a wall of a combustor of a gas turbine engine, the method comprising:
   heating the wall of the combustor;
   directing a flow of cooling fluid through the one or more cooling holes in the wall of the combustor while the wall is being heated;
   acquiring a first measurement indicative of a flow rate of the cooling fluid through the one or more cooling holes; and
   acquiring a second measurement indicative of a cooling effectiveness provided by the cooling fluid flowing through the one or more cooling holes at the flow rate;
   wherein the acquisition of the first measurement and the acquisition of the second measurement are done substantially simultaneously;
   wherein the acquisition of the first measurement and the acquisition of the second measurement are done at substantially steady-state conditions when a temperature of the wall is substantially stable.

2. The method as defined in claim 1, wherein the first measurement comprises at least one of a pressure drop across the wall of the combustor, a fluid temperature upstream of the wall and a fluid pressure upstream of the wall.

3. The method as defined in claim 1, wherein the second measurement comprises a temperature at one or more points on the wall.

4. The method as defined in claim 1, wherein the second measurement comprises a thermal image of at least a portion of the wall.

5. The method as defined in claim 1, wherein the cooling fluid comprises pressurised ambient air.

6. The method as defined in claim 1, wherein the cooling fluid comprises ambient air and only pressurization is conducted on the cooling fluid prior to being directed through the one or more cooling holes.

7. The method as defined in claim 1, wherein the heating of the wall comprises directing radiant energy towards the wall.

8. The method as defined in claim 1, wherein the heating of the wall comprises directing a flow of heating fluid towards the wall.

9. A method for inspecting one or more cooling holes in a part, the method comprising:
   heating the part;
   directing a flow of cooling fluid through the one or more cooling holes of the part while the part is being heated;
   acquiring a first measurement indicative of a flow rate of the cooling fluid through the one or more cooling holes; and
   acquiring a second measurement indicative of a cooling effectiveness provided by the cooling fluid flowing through the one or more cooling holes at the flow rate;
   wherein the acquisition of the first measurement and the acquisition of the second measurement are done substantially simultaneously;
   wherein the acquisition of the first measurement and the acquisition of the second measurement are done at substantially steady-state conditions when a temperature of the wall is substantially stable.

10. The method as defined in claim 9, wherein the cooling fluid comprises ambient air and only pressurization is conducted on the cooling fluid prior to being directed through the one or more holes in the part.

11. The method as defined in claim 10, wherein the heating of the wall comprises directing radiant energy towards the wall.

* * * * *